United States Patent
Glasgow

[19]

[11] Patent Number: 6,056,128

[45] Date of Patent: May 2, 2000

[54] COALESCER WITH REMOVABLE CARTRIDGE

[76] Inventor: James A. Glasgow, 7481 Timberlane Dr., Cincinnati, Ohio 45243

[21] Appl. No.: 09/128,884

[22] Filed: Aug. 4, 1998

[51] Int. Cl.[7] .................................................. C02F 1/40
[52] U.S. Cl. ......................... 210/521; 210/522; 210/540; 210/DIG. 5
[58] Field of Search .................................... 210/234, 238, 210/320, 521, 522, 540, DIG. 5

[56] References Cited

U.S. PATENT DOCUMENTS

| | | |
|---|---|---|
| 554,815 | 2/1896 | Field . |
| 1,164,527 | 12/1915 | Kelly, Jr. . |
| 1,200,951 | 10/1916 | Kelly, Jr. . |
| 1,672,583 | 6/1928 | Travers . |
| 2,181,684 | 11/1939 | Walker . |
| 2,585,878 | 2/1952 | Tryon . |
| 2,747,736 | 5/1956 | Mobley . |
| 3,303,932 | 2/1967 | Hirs et al. . |
| 3,688,909 | 9/1972 | Titus et al. . |
| 3,849,308 | 11/1974 | Westerman . |
| 3,849,311 | 11/1974 | Jakubek . |
| 3,923,661 | 12/1975 | Crisafulli . |
| 3,933,654 | 1/1976 | Middlebeek . |
| 3,951,810 | 4/1976 | Crisafulli . |
| 3,953,332 | 4/1976 | Speth et al. . |
| 3,970,556 | 7/1976 | Gore . |
| 4,024,063 | 5/1977 | Mori . |
| 4,064,054 | 12/1977 | Anderson et al. . |
| 4,122,016 | 10/1978 | Tao et al. . |
| 4,123,365 | 10/1978 | Middlebeek . |
| 4,132,645 | 1/1979 | Bottomley et al. . |
| 4,132,651 | 1/1979 | deJong . |
| 4,199,451 | 4/1980 | Hsiung et al. . |
| 4,224,162 | 9/1980 | Ayroldi . |
| 4,257,895 | 3/1981 | Murdock . |
| 4,265,759 | 5/1981 | Verpalen et al. . |
| 4,273,654 | 6/1981 | Pielkenrood . |
| 4,299,706 | 11/1981 | Smith . |
| 4,301,008 | 11/1981 | Baffert et al. . |
| 4,333,835 | 6/1982 | Lynch . |
| 4,351,733 | 9/1982 | Salzer et al. . |
| 4,385,986 | 5/1983 | Jaisinghani et al. . |

(List continued on next page.)

FOREIGN PATENT DOCUMENTS

| | | |
|---|---|---|
| 0 415 121 A1 | 3/1991 | European Pat. Off. . |
| 2426388 | 12/1979 | France . |
| 1484845 | 9/1969 | Germany . |

OTHER PUBLICATIONS

Abanki Corporation, Oil Skimmer division, *Oil Skimmers*.
Burke, *Standard and Custom Milling Machines*, Modern Machine Shop advertisement.
CLC Lubricants, *Li'l Tramp Skimmer/Aerator*.
CLC Lubricants, *Skimerator—Skimmer/Aerator*.
Douglas Engineering, *Skim–Pak Pump Systems*.
Douglas Engineering Coolant Recycling Systems, *Skim–Pak Skimmers and Tramp Oil Separators*.
Dyna Tech Chemical Specialties, Inc., *The Coolant Manager*.

(List continued on next page.)

*Primary Examiner*—W. L. Walker
*Attorney, Agent, or Firm*—Wood, Herron & Evans, L.L.P.

[57] ABSTRACT

A coalescer for separating a first liquid component from a multiple component liquid mixture wherein the first liquid component has a lower specific gravity than the liquid mixture. The coalescer comprises a generally rectangular housing defining an entry port and an exit port and a flow path therebetween. A grid contained within a removable cartridge is received within the housing and includes a plurality of parallel inclined plates residing along the flow path to separate the first liquid component from the liquid mixture. A second liquid port in communication with the flow path via an outlet causes the first liquid component to flow into a separate container. The liquid mixture continues to flow through the coalescer until all of the first liquid component is removed.

28 Claims, 3 Drawing Sheets

6,056,128
Page 2

U.S. PATENT DOCUMENTS

| | | |
|---|---|---|
| 4,396,508 | 8/1983 | Broughton . |
| 4,400,274 | 8/1983 | Protos . |
| 4,400,280 | 8/1983 | Larsson et al. . |
| 4,405,458 | 9/1983 | McHugh, Jr. . |
| 4,446,018 | 5/1984 | Cerwick . |
| 4,554,074 | 11/1985 | Broughton . |
| 4,559,141 | 12/1985 | Gyulavári . |
| 4,585,556 | 4/1986 | Mackrle et al. . |
| 4,636,320 | 1/1987 | Figiel et al. . |
| 4,722,800 | 2/1988 | Aymong . |
| 4,728,440 | 3/1988 | van Kuijeren . |
| 4,746,424 | 5/1988 | Drew . |
| 4,747,948 | 5/1988 | North . |
| 4,755,292 | 7/1988 | Merriam . |
| 4,769,131 | 9/1988 | Noll et al. . |
| 4,797,210 | 1/1989 | Lonardo . |
| 4,867,872 | 9/1989 | Russell et al. . |
| 4,892,666 | 1/1990 | Paulson . |
| 4,897,206 | 1/1990 | Castelli . |
| 4,956,100 | 9/1990 | Mikkleson . |
| 4,980,070 | 12/1990 | Lieberman . |
| 5,030,342 | 7/1991 | Ortega . |
| 5,053,145 | 10/1991 | Ellison . |
| 5,059,312 | 10/1991 | Galletti . |
| 5,066,407 | 11/1991 | Furlow . |
| 5,076,937 | 12/1991 | Montgomery . |
| 5,114,578 | 5/1992 | Sundström . |
| 5,151,185 | 9/1992 | Hammerschmitt . |
| 5,154,835 | 10/1992 | DeMichael . |
| 5,160,605 | 11/1992 | Noestheden . |
| 5,167,815 | 12/1992 | Bachmann et al. . |
| 5,296,150 | 3/1994 | Taylor, Jr. . |
| 5,326,474 | 7/1994 | Adams et al. . |
| 5,378,376 | 1/1995 | Zenner . |
| 5,393,429 | 2/1995 | Nakayama et al. . |
| 5,397,472 | 3/1995 | Bouchard . |
| 5,405,538 | 4/1995 | Batten . |
| 5,451,330 | 9/1995 | Garrett . |
| 5,499,643 | 3/1996 | Vincent, Jr. et al. . |
| 5,520,825 | 5/1996 | Rice . |
| 5,547,569 | 8/1996 | Spencer . |
| 5,554,301 | 9/1996 | Rippetoe et al. . |
| 5,558,780 | 9/1996 | Vancas . |
| 5,601,705 | 2/1997 | Glasgow . |
| 5,762,810 | 6/1998 | Pelton et al. . |
| 5,795,478 | 8/1998 | Hirs . |
| 5,874,008 | 2/1999 | Hirs . |

OTHER PUBLICATIONS

E&K Sales, Inc., Carol Company, *Tramp Oil Disc Skimmer*.

Ebbco Inc., *TechSketch Oily Water Separator With Pump & Skimmer*.

ENERPAC Hydraulic Technology Worldwide, *Turbo Air Pump*, Modern Machine Shop advertisement.

Facet International, *Engineering Clear Solutions for Environmental Clean–up—Coalesing Plate Separators: MAS Series*.

Master Products, *Master Oil Skimmer*, Modern Machine Shop advertisement.

PhaSep—Phase Separation Systems, *Parallel Plate Coalescing Systems for Phase Separation*, 1987.

Ransohoff, Pro–Save, *Decant Tank*.

Rising Sump Skimmers, *Skimmers*, brochure with copy of two photographs.

Ruddux Corporation, *Ruddux Coolant System*.

Virginia Panel/Mori Seiki, *Conventional Oil Skimming Techniques, Picture from Virginia Panel/Mori Seiki*.

Wastewater Engineers, Inc., *Background Information and Brochure*.

Wayne Products, Inc., *Skinni–Mini*, Drum Oil Skimmer.

Zebra Skimmers, *Big Dipper—Disk Oil Lifter*, Modern Machine Shop advertisement.

Zebra Skimmers, *Big Dipper Disk Oil Lifter, Cost Savings Calculations for the Big Dipper vs. Conventional Oil Skimming Tehniques*, product flier.

COALESCER WITH REMOVABLE CARTRIDGE

FIELD OF THE INVENTION

This invention relates generally to removing a nonsoluble oil from an aqueous solution used as coolant in a machining environment. More particularly, this invention relates to a coalescer unit which separates tramp oil from an aqueous solution so that the useful life of the aqueous solution may be prolonged.

BACKGROUND OF THE INVENTION

In many machining operations, an aqueous coolant is sprayed or flowed at the location where a cutting tool engages the workpiece, for lubrication and cooling purposes. The coolant is then collected in a tank located below the machine and recycled for continuous use for as long as possible.

Aqueous coolants of this type are fairly expensive, so it is advantageous to maintain such aqueous coolants in usable condition for as long as possible. Typical machining operations also include lubricating oil for lubricating movable parts. Eventually, this oil drips or flows into the aqueous coolant tank, where it floats upon the surface of the aqueous coolant due to its lighter weight and lower density. This oil, referred to as "tramp oil," will eventually also contribute to bacterial growth within the aqueous coolant, resulting in a foul odor and reducing the useful life of the aqueous coolant.

Due to environmental concerns, the oil-contaminated aqueous coolant must be treated as hazardous waste, and therefore represents an environmental and economic concern. Thus, tramp oil represents a serious environmental and economic problem with respect to maintaining proper and cost effective aqueous coolant use during machining operations.

A number of skimming devices have been developed over the years to remove tramp oil from the surface of aqueous coolant in a coolant tank for a machine. Disk skimmers include a disk which extends into the aqueous coolant and into contact with the tramp oil. Rotation of the disk near the surface results in removal of some oil from the surface, whereupon it is scraped by a blade and removed. Belt type skimmers involve an endless belt which removes tramp oil from the surface of the aqueous coolant, whereupon it is also scraped therefrom for removal. Disk and belt skimmers of this type are relatively inefficient and have space limitations for proper mounting and operation.

Floating tube skimmers and weir-type skimmers adapt to liquid level fluctuations, and they generally include a pump for pumping the skimmed liquid to a separation device. Such skimmers have proved to be acceptable in relatively large bodies such as lakes, ponds, rivers or even oceans. However, their size typically prevents their use in machining applications. In machining operations, most coolant tanks are as shallow as five or six inches, or as deep as 14 to 16 inches. Also, some machining coolant tanks are located in relatively inaccessible places without much spare space located adjacent thereto.

Weir-type skimmers also have the disadvantage of being too large to be readily adapted for machining operations. With floating tube or weir-type skimmers, liquid is retrieved from the tank via a suction line operatively connected to a suction pump. For most operations of this type, a positive displacement pump provides this suction force. Because the liquid removed from the tank includes a mixture of two different liquid components, and the proportions of these two liquid components vary over a period of use, the volume pulled by the pump is subject to variation. These volume variations can adversely affect the efficient operation of the pump and the entire system. Thus, while these relatively large size skimming devices have proved effective in their specific environment, i.e. large bodies of water, they suffer from some disadvantages which would be aggravated if the devices were to be adapted for use in relatively small coolant tanks.

In summary, in machining operations it is necessary to skim primarily tramp oil from the surface of the aqueous coolant in the tank (though the skimmed liquid will also include some coolant), to deliver the tramp oil coolant mixture to a separation unit, to separate the tramp oil from the aqueous coolant for collection, and to return the aqueous coolant to the tank for reuse.

One system which accomplishes this is disclosed in both U.S. Pat. No. 5,601,705 and U.S. patent application Ser. No. 08/644,920 (now abandoned) which are both hereby fully incorporated by reference. One component of the system disclosed in these documents is a coalescer having an outer housing with an entry port and an exit port and a flow path therebetween. The aqueous coolant contaminated with tramp oil is pumped through the entry port of the coalescer, passes through the coalescer in which the tramp oil is removed, the cleansed coolant exiting the exit port of the coalescer. Inside the housing, a plurality of baffles define the flow path of the aqueous coolant. Due to the lower specific gravity of the tramp oil relative to the aqueous coolant, the tramp oil rises through a hollow fitting located above the first exit port and exits via an outlet where it is collected.

One difficulty with the coalescer disclosed in applicant's abandoned patent application Ser. No. 08/644,920 is that dirt accumulates in the coalescing tank after several months. A sludge drain may be installed on the bottom of the coalescing tank which allows dirt on the bottom of the tank to drain out. However, not all the dirt drains out because dirt builds up between the plates. Dirt and other contaminates which build up on the plates are not easily removed by simply opening the drain plug. Because the coalescer is a sealed single unit, cleaning of the plates is difficult and requires a great deal of time and effort because the plates are neither visible nor accessible. Applicant's present invention allows for quick and easy removal of the plates and easy access for cleaning the plates.

Thus, it is an object of the present invention to provide a coalescer having parallel plates which are removable and may be quickly and easily cleaned for proper operation of the coalescer.

It is another object of the present invention to provide a coalescer which may be quickly and easily flushed of sludge or dirt which accumulates on the bottom of the coalescer.

It is another object of the present invention to provide a coalescer which has a removable cartridge which may be quickly and accurately fixed in a specific location so as to cause the coalescer as a unit to operate properly.

It is a further object of this invention to optimize the useful life of aqueous coolant used in conjunction with the operation of a machine tool. As a corollary, it is also an object of this invention to minimize the bacteria formation and hazardous waste conditions created by tramp oil contamination of such aqueous coolant.

SUMMARY OF THE INVENTION

The present invention achieves the above noted objects by utilizing a coalescer for separating a first liquid component from a multi component liquid mixture whereby the first liquid component has a lower specific gravity than the liquid mixture. The first liquid component is commonly referred to as tramp oil and the liquid mixture is a combination of tramp oil and aqueous coolant in most instances. The coalescer comprises a housing having walls which define a second entry port and a first exit port and a flow path therebetween. The multiple component liquid mixture enters the second entry port and exists the coalescer via the first exit port preferably with a volume of the first liquid component being removed as the mixture flows therebetween.

The coalescer further comprises a grid, including a plurality of parallel inclined plates contained within a removable cartridge. The cartridge is adapted to be removably received within the interior of the coalescer housing and has a second exit port formed therein. The grid resides along the flow path between the second entry port and the first exit port of the housing to promote separation of the first liquid component from the multiple component liquid mixture when the liquid mixture flows along the flow path to the first exit port. The difference in densities between the first liquid component and the liquid mixture causes the first liquid component to raise upwardly in the housing and thus separate from the liquid mixture.

The second exit port formed in the removable cartridge is in fluid communication with the flow path of the liquid mixture via an outlet. The outlet is located above the grid and is an integral part of the removable cartridge. The outlet is located at a first vertical level above the first exit port whereby the first liquid component moves upwardly through the outlet into a trough formed in the removable cartridge above the grid. The first liquid component flows from the trough through the second exit port and a discharge port in the coalescer housing outwardly from the housing as the liquid mixture flows along the flow path during operation of a pump. The first liquid component is collected within a container while the liquid mixture is returned to the tank from which it was pumped to the coalescer. The pump causes the multiple component liquid mixture to flow into the second entry port of the housing, through the flow path and out the first exit port of the housing. A timer may cycle the pump so the pump does not operate continuously.

The removable cartridge has four flanges which are aligned with and engage four vertical tracks formed in the plates or walls of the housing thereby fixing the location of the removable cartridge inside the housing in a horizontal direction. A discharge spout having a threaded end is adapted to threadably engage the discharge port formed in the housing and the second exit port formed in the removable cartridge to align the removable cartridge inside the housing and prevent the removable cartridge from moving vertically relative to the housing. The design of the coalescer enables an operator to quickly and easily fix the location of the removable cartridge inside the housing to ensure proper operation of the coalescer.

The removable cartridge further has a pair of handles at the top thereof which have indentations which enables a user to quickly and easily grasp the removable cartridge and remove it from the interior of the coalescer housing for cleaning or other purposes.

The removable cartridge also has a first wall and a second wall located on opposite ends of the grid, the flanges mentioned hereinabove being an integral part of the first and second walls. The removable cartridge also has an inclined top wall so as to define a trough and a plate chamber. The trough is defined by the top wall of the removable cartridge and upper portions of the four walls of the removable cartridge. The plate chamber is located underneath the top wall of the removable cartridge and is defined by the top wall and first and second walls of the removable cartridge and front and back plates of the housing. The outlet mentioned hereinabove passes through the top wall of the removable cartridge. The first wall of the removable cartridge is spaced from the first entry port, defining a fill volume therebetween. In order to slow the flow rate into the grid mentioned hereinabove, at least one vertically oriented opening is formed in the first wall of the removable cartridge to allow the liquid mixture to flow from the fill volume toward the grid at a relatively slow flow rate, thus providing better separation of the first liquid component from the liquid mixture. These vertically oriented openings allowing the liquid mixture to diffuse toward the grid in a horizontal direction.

The first wall of the removable cartridge also includes a horizontally oriented escape slot located above the vertically oriented openings. The escape slot is strategically positioned above the bottom edge of the outlet formed through the top wall of the removable cartridge. The purpose of the escape slot is to vent air bubbles from the plate chamber and to keep air bubbles from escaping through the outlet. If air bubbles were able to pass into the outlet, they would bring coolant with them, contaminating the oil being removed. The first wall further includes a pair of foam overflow slots at the upper end of the first wall which allow foam to flow from the fill volume into the trough (toward the second exit port) during a foam overflow condition in the fill volume.

Lastly, the first wall of the removable cartridge has a cutout portion at the bottom of the first wall of the removable cartridge. The cutout portion allows for a flushing action of sludge which accumulates on the bottom of the coalescer housing when the pump is running and the tank is empty of fluid. The removable cartridge rests on an inclined bottom wall of the housing. The parallel plates of the grid contained within the removable cartridge are substantially parallel the inclined bottom wall of the housing.

The second wall of the removable cartridge also has features which improve the performance of the coalescer. The second wall of the removable cartridge is spaced from an outer wall of the housing defining an exit volume therebetween. The second wall also has a cutout portion formed in the bottom of the second wall to aid in the flushing operation described hereinabove. Additionally, the second wall of the removable cartridge has a pair of second overflow slots formed at the top thereof located on opposite sides of the handle. If the second exit port becomes clogged or obstructed, the first liquid component will overflow from the trough through the second overflow slots into the exit volume and out the first exit port. Thus, these second overflow slots prevent the coalescer from overflowing should the second exit port or discharge port become clogged or obstructed.

These and other features of the invention will be more readily understood in view of the following detailed description and the drawings.

DETAILED DESCRIPTION OF THE INVENTION

Figure 1:
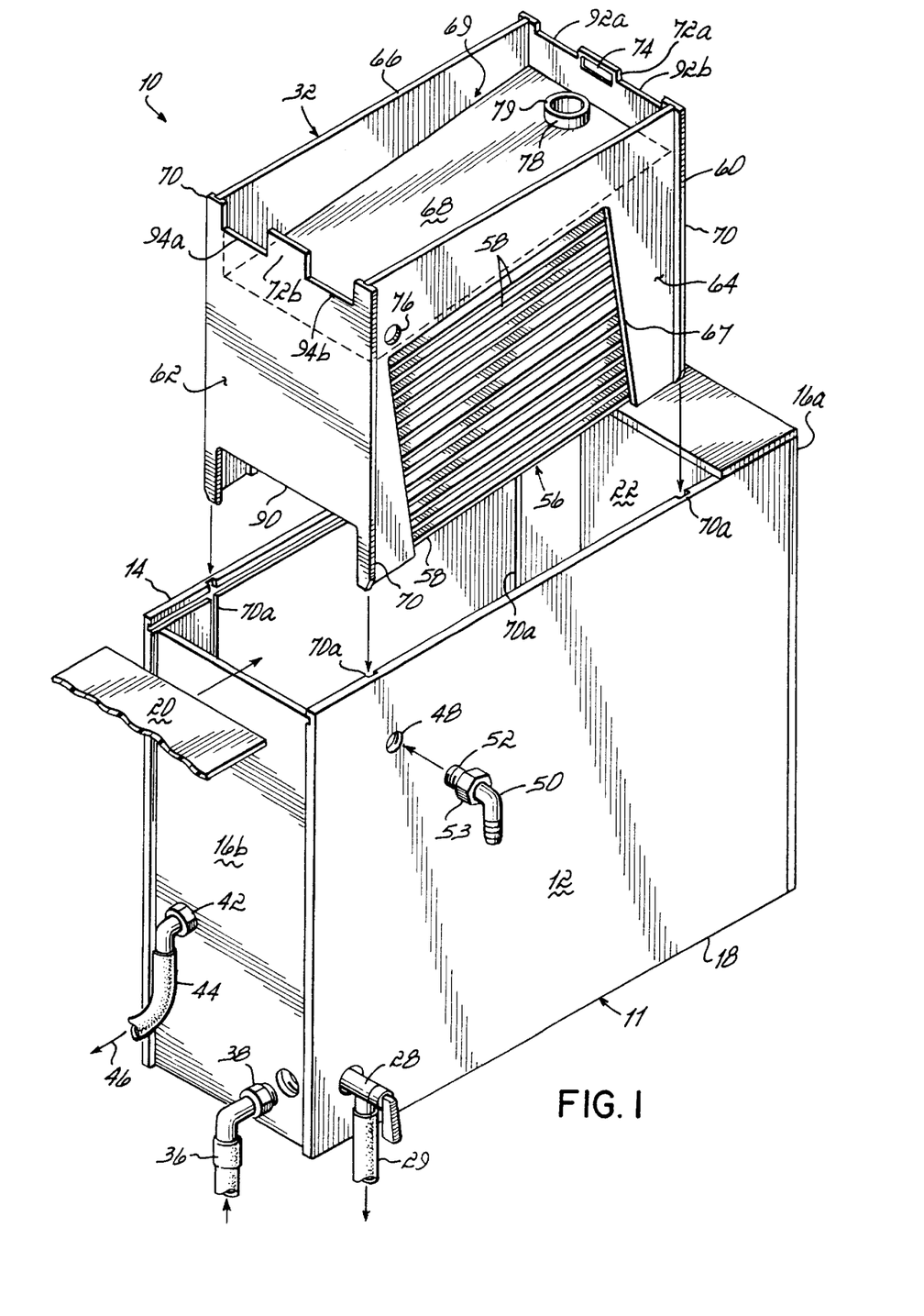
FIG. 1 is an exploded perspective view of the coalescer of the present invention.
Figure 2:
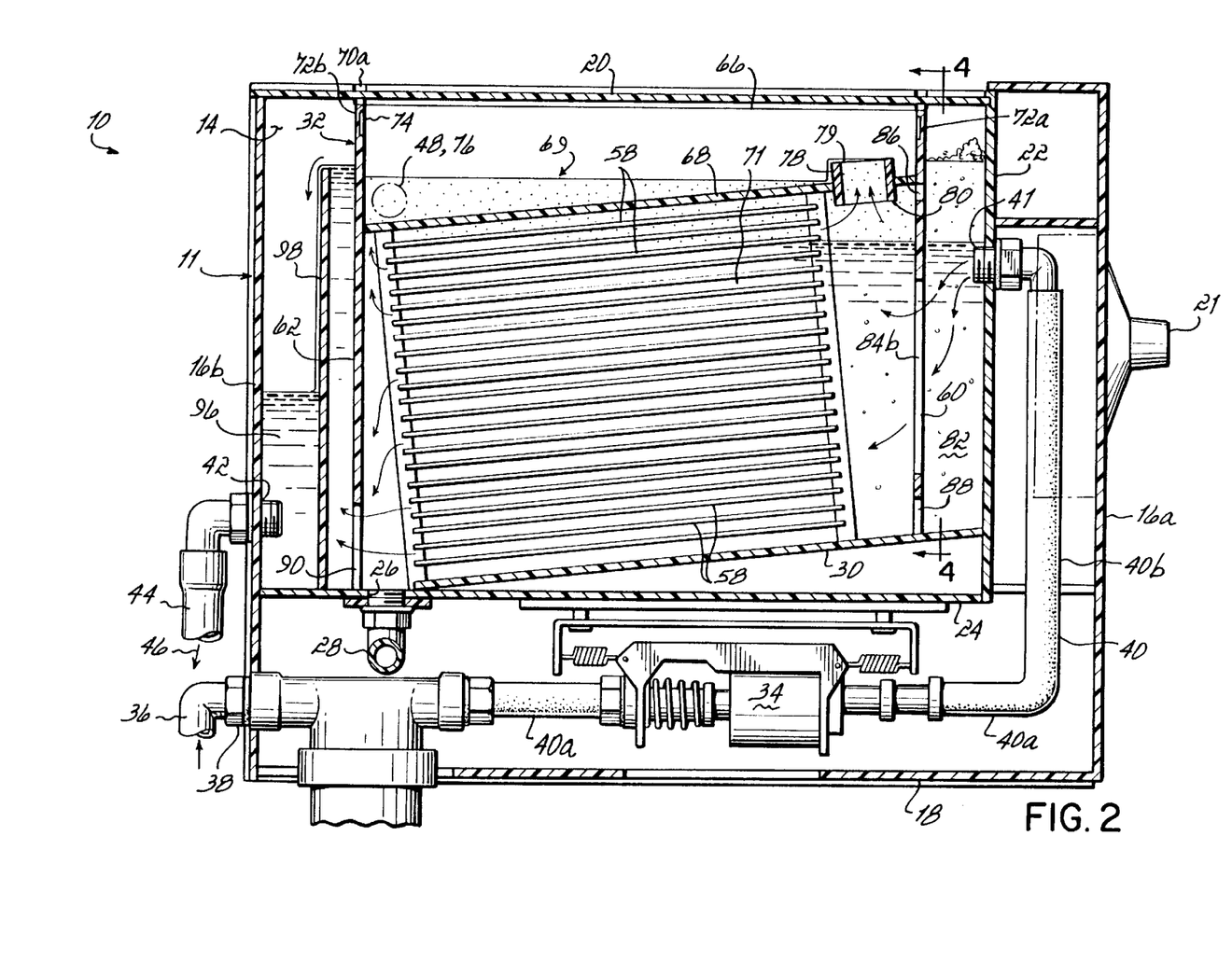
FIG. 2 is a longitudinal cross-sectional view of the coalescer shown in FIG. 1 with the removable cartridge fixed inside the interior of the coalescer housing.

Referring to the drawings and particularly to FIG. 1, there is illustrated a coalescer 10 for separating a first liquid component from a multiple component liquid mixture wherein the first liquid component has a lower specific gravity than the liquid mixture. The coalescer 10 has a housing 11 comprising a front plate 12, a back plate 14 and two side plates 16a, 16b. As best seen in FIG. 2, the housing 11 further includes a bottom plate 18 and a removable top plate 20.

As illustrated in FIG. 2, an intermediate sidewall 22 extends from the top of the housing 11 downwardly to an intermediate bottom wall 24. A sludge hole 26 which communicates with a sludge line 29 (see FIGS. 1 and 2) is located in the intermediate bottom wall 24. A sludge drain valve 28 enables the sludge line 29 to be selectively opened and closed. Located immediately above the intermediate bottom wall 24 is an inclined bottom wall 30 which is slanted downwardly (from right to left as seen in FIG. 2) towards the sludge hole 26. The inclined bottom wall 30 supports a removable cartridge 32 which is removably received within the interior of the housing 11 (see FIG. 1).

Referring to FIG. 2, located between the intermediate bottom wall 24 and the bottom plate 18 of the housing is a conventional positive displacement pump 34 such as a Gorman Rupp pump sold under Model No. 92462-000. Mounted on the side plate 16a of the housing is a timer 21 which controls the operation of the pump 34. The multiple component liquid mixture flows from a tank (not shown) through an inlet 36 which passes through a first entry port 38 in the housing side plate 16b. The liquid mixture flows through a tube 40 inside the outer plates of the coalescer housing 11 until the liquid mixture reaches a second entry port 41 formed through the intermediate sidewall 22. The tube 40 has a horizontal section 40a and a vertical section 40b. Once the liquid mixture passes through second entry port or fixture 41, the liquid mixture flows along a flow path (from right to left in FIG. 2) until the liquid mixture flows out a first exit port 42 formed in side plate 16b. An outlet tube 44 in communication with the first exit port 42 causes the liquid mixture to flow in the direction of arrow 46 back to the tank storing the liquid mixture (not shown).

Referring back to FIG. 1, a threaded discharge port 48 is formed through the front plate 12 of the coalescer housing 11. The discharge port 48 is adapted to threadably receive a discharge spout 50 which has a threaded end 52 and has a hollow interior so as to define a flow path therethrough. A flange 53 is formed on the discharge spout 50 so that an O ring 54 may rest between the flange 53 and the threaded end 52 (see FIGS. 1 and 5).

Referring to FIG. 1, the removable cartridge 32 has a grid 56 comprising a plurality of parallel inclined plates 58 which reside along the flow path between the second entry port 41 and the first exit port 42 to promote separation of the first liquid component from the liquid mixture as the liquid mixture flows along the flow path to the first exit port 42. The difference in densities between the first liquid component and the liquid mixture causes the first liquid component to rise upwardly in the housing. The relatively short distance between plates of the grid limits the upward mobility of the first liquid component before it contacts the bottom of one of the plates and coagulates into a larger mass.

The removable cartridge 32 comprises a first wall 60, a second wall 62, a front wall 64 and a back wall 66. The parallel plates 58 are located between the first and second walls 60, 62 and below an inclined top wall 68 which extends upwardly from left to right as seen in FIGS. 1 and 2. The removable cartridge 32 has no bottom wall. Further, the front and back walls 64, 66 of the removable cartridge 32 have open portions 67 (only one being shown in FIG. 1). These open portions allow an operator to easily clean the grid 56 once the cartridge 32 is removed from inside the housing 11.

The outer edges 70 of the first and second walls 60, 62 of the removable cartridge 32 are of a thickness so as to be able to slide within four vertically oriented tracks 70a formed in the front and back plates 12, 14 of the coalescer housing 11. Engagement of the edges 70 of the first and second walls 60, 62 of the cartridge 32 in the tracks 70a prevents the cartridge from moving horizontally and enables the cartridge to be lifted vertically in order to be removed from inside the housing of the coalescer once the top plate 20 is removed.

A trough 69 is defined by the top wall 68 of the removable cartridge and upper portions of the four walls 60, 62, 64 and 66 of the removable cartridge 32. The trough 69 is located above the top wall 68 of the removable cartridge and functions to collect and discharge the first liquid component of the liquid mixture.

Similarly, a plate chamber 71 is defined partially by the top wall of the removable cartridge. The plate chamber 71 is defined by the top wall 68 of the removable cartridge, the first and second walls 60, 62 of the removable cartridge and the front and rear plates 12, 14 of the coalescer housing when the removable cartridge is secured inside the interior of the coalescer housing 11. The plate chamber 71 is located underneath the top wall 68 of the removable cartridge 32.

The first and second walls 60, 62 of the removable cartridge 32 have handles 72a, 72b respectively formed at the tops thereof which enable a user to easily grasp the removable cartridge 32 and pull it upwardly away from the coalescer housing 11. Each handle has an indentation 74 formed therein (only one shown in FIG. 1) so that a user may place his or her thumbs in the indentations for easier grasp of the removable cartridge 32 in order to remove it from inside the coalescer housing.

Figure 5:
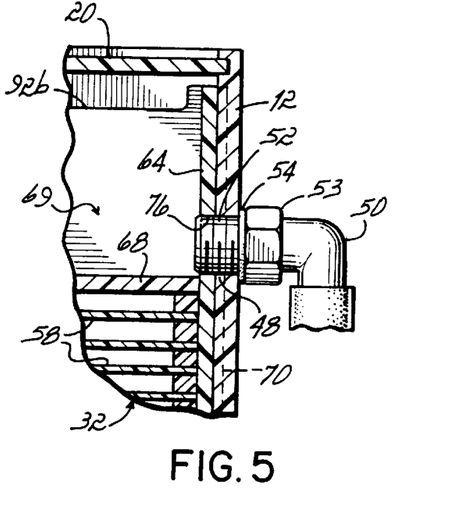
FIG. 5 is a cross-sectional view showing a discharge spout threadable engaged with the coalescer housing and removable cartridge to fix the location of the removable cartridge inside the coalescer housing.

The front wall 64 of the removable cartridge 32 has a circular second exit port 76 formed therethrough which is in fluid communication with the trough 69 defined above the top wall 68 of the removable cartridge 32. The second exit port 76 is threaded like the discharge port 48 formed in the front plate 12 of the housing 11 and is located so as to align with the discharge port 48 when the removable cartridge 32 is located inside the interior of the housing 11 (as seen in FIG. 5). In this position, with the second exit port 76 aligned with the discharge port 48, the discharge spout 50 may be threadable engaged with the discharge port 48 of the housing 11 and the second exit port 76 of the removable cartridge 32 to accurately set the position of the removable cartridge 32 relative to the coalescer housing 11. Thus, when the removable cartridge 32 is fixed in position inside the interior of the housing 11, the discharge spout 50 functions as a key in order to lock the removable cartridge 32 in its proper position. With the discharge spout 50 so engaged with both the discharge port 48 and the second exit port 76 of the removable cartridge 32, the removable cartridge 32 may not be removed from inside of the coalescer housing 11 even if a user pulls upwardly on the handles 72a, 72b of the removable cartridge 32. Thus, the discharge spout 50 locks the removable cartridge 32 in its proper operating position and prevents any unwanted movement of the cartridge relative to the housing. Only if the discharge spout 50 is disengaged from the second exit port 76 of the removable cartridge 32 may the removable cartridge 32 be lifted up and removed from the interior of the coalescer housing 11.

Once the removable cartridge 32 is locked in place inside the housing 11 with the discharge spout 50, all of the specifically designed features of the coalescer of this application will operate as intended. If the removable cartridge 32 was installed in any other position, the coalescer would not operate properly. For example, if the removable cartridge 32 was installed just 0.2 inches below its proper position, oil would not exit the plate chamber via the outlet 78, but rather only coolant would be discharged. Further, if the removable cartridge 32 was mistakenly installed 0.5 inches higher than its proper position, neither coolant nor oil would be removed. If the removable cartridge 32 were located to the right or left by just 0.2 inches, an improper flow would occur and the ability of the coalescer to remove oil would be diminished. Thus, the specific design of the removable cartridge and coalescer housing enables the removable cartridge 32 to be locked in a fixed position in which the coalescer 10 will operate as intended. Once the discharge spout 50 is screwed in place, fixing the location of the removable cartridge 32, the coalescer is essentially foolproof.

An outlet 78 comprising a cylindrical tube is formed through the top wall 68 of the removable cartridge 32 and is located generally above the grid 56 at a first level above the first exit port 42. The first liquid component moves upwardly through the outlet 78 and into the trough 69 located above the top wall 68 of the removable housing 11 as the liquid mixture is flowing along the flow inside the coalescer housing 11. The outlet 78 is cylindrical and has a top edge 79 raised slightly above the top wall 68 of the removable cartridge 32 and a bottom edge 80 located below the top wall 68 of the removable cartridge 32 (see FIGS. 2 and 3). Once the first liquid component (tramp oil) flows through the outlet 78 into the trough 69, it flows downwardly on top of the top wall 68 of the removable cartridge 32 through the second exit port 76, through the discharge port 48, through the discharge spout 50 and into a separate container (not shown) where it is collected. This process occurs at the same time the liquid mixture flows along the flow path during operation of the pump and the cleansed liquid mixture is exiting the coalescer housing through first exit port 42 into the tank (not shown).

Figure 3:
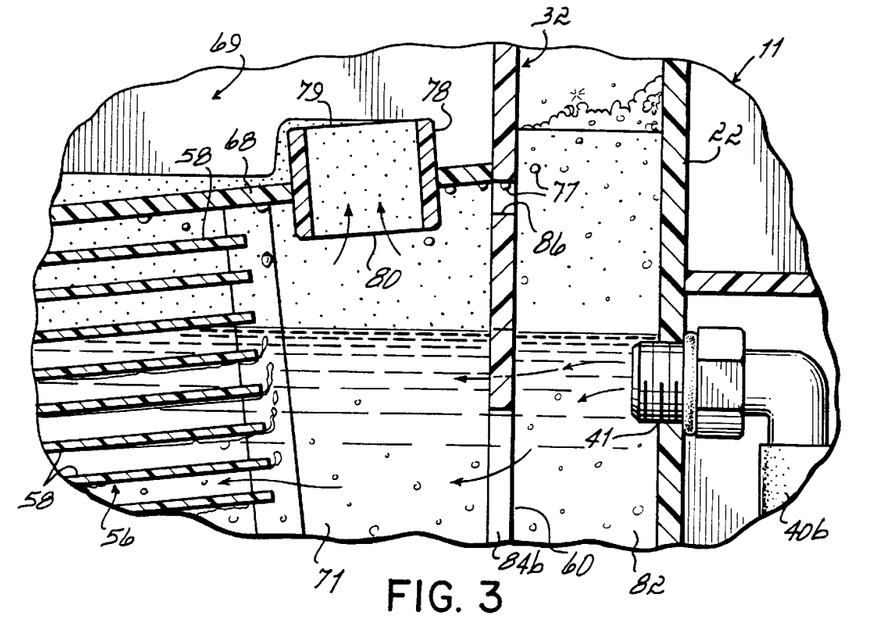
FIG. 3 is an enlarged side elevational view of the entry port of the coalescer and the outlet of the removable cartridge.
Figure 4:
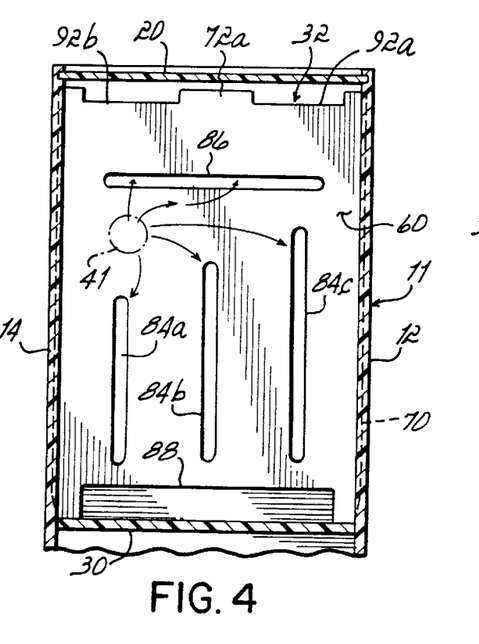
FIG. 4 is a view taken along the line 4—4 of FIG. 2.

As best seen in FIGS. 2 and 3, the first wall 60 of the removable cartridge 32 is located a distance inwardly from the intermediate sidewall 22 of the housing 11. The intermediate sidewall 22 and first wall 60 of the removable cartridge 32 define a fill volume 82 therebetween through which the fluid mixture immediately enters upon leaving the second entry port 41 (see FIG. 2). As best illustrated in FIG. 4, the first wall 60 of the removable cartridge 32 has therein three vertically oriented openings 84a, 84b and 84c. Although three openings are shown with opening 84a being shorter than opening 84b which is shorter than opening 84c, the number and length of the openings may vary in accordance with the present invention. The function of the vertically oriented openings 84a, 84b, and 84c is to act as a diffuser so as to slow down the flow rate of the fluid mixture entering the grid from the fill volume. A slower flow rate through the flow path of the coalescer allows for better separation of the first liquid component from the liquid mixture.

Again referring to FIG. 4, an escape slot 86 is formed through the first wall 60 of the removable cartridge 32. The escape slot 86 is horizontally oriented and located generally above the second inlet port 41. As best illustrated in FIG. 3, the escape slot 86 is located at a vertical level above the bottom edge 80 of the outlet 78. This allows air which becomes trapped inside the grid (inside the plate chamber) to escape from underneath the top wall 68 of the removable cartridge 32 without having to pass through the outlet 78. Air bubbles 77 formed in the plate chamber 71 rise until they contact the bottom surface of the top wall 68. The air bubbles then work their way upward along the bottom surface of the top wall 68 (from left to right as seen in FIG. 2) past the outlet 78 and through the escape slot 86. Because the bottom edge 80 of the outlet 78 is located below the escape slot 86, the air bubbles exit the plate chamber 71 via escape slot 86 rather than through the outlet 78. Thus, the air bubbles or foam passes through the escape slot 86 (from left to right as seen in FIG. 3) and becomes vented to the atmosphere thus not interrupting the separation process which the coalescer performs. If the air bubbles were permitted to escape with the oil via the outlet, they would create a percolating effect and bring up coolant with them thus contaminating the tramp oil or first liquid component with coolant.

Another feature of the first wall 60 of the removable cartridge 32 which is specifically designed to improve the performance of the coalescer is that the first wall 60 has a cutout portion 88 which is generally rectangular and located at the bottom of the first wall (see FIG. 4). Thus, when a user desires to flush the bottom of coalescer in order to remove sludge or dirt which has accumulated on top of the inclined bottom wall 30, the user opens the sludge drain valve 28 in order to empty the coalescer of fluid. The removable cartridge 32 is then typically removed to be cleaned. Alternatively, due to the cutout portion 88 in the first wall 60, the removable cartridge 32 may remain in place. The user then turns on the pump 34 to bring fluid from the tank (not shown) into the coalescer housing 11 via the second entry port or fixture 41. The fluid runs along the intermediate bottom wall 30 of the housing 11, flushing the sludge or dirt which has accumulated on the bottom of the coalescer through the sludge hole 26 and out the sludge line 29 (see FIG. 2). A flush volume is defined above the inclined bottom wall 30 and the grid 56.

As seen in FIG. 1, a similar cutout portion 90 is removed from the bottom of the second wall 62 of the removable cartridge 32 in order to further facilitate removal of sludge and debris from the bottom of the plate chamber during the flushing operation described hereinabove.

Referring back to FIG. 4, two foam overflow slots 92a, 92b are formed in the top of the first wall 60 of the removable cartridge 32 on both sides of the handle 72a. If excessive foam builds up in the fill volume 82 and the top plate 20 of the housing is on top of the removable cartridge, the foam overflow slots 92a, 92b allow foam to flow over the top of the first wall 60 and into the trough 69 where the foam may exit with the first liquid component out the second exit port 76. This is a rare occurrence but without the foam overflow slots, the air would have nowhere to go and could cause the coalescer not to function properly. The top edge 79 of the outlet 78 being above the top wall 68 of the removable cartridge 32 prevents foam from flowing down the outlet 78 and going back into the plate chamber 71.

Referring to FIG. 1, the second wall 62 of the removable cartridge 32 has a pair of second overflow slots 94a, 94b located on opposite sides of the handle 72b. These second overflow slots 94a, 94b are located below the location of the foam overflow slots 92a, 92b. These second overflow slots 94a, 94b allow either the first liquid component or foam to flow from the trough 69 into an exit volume 96 should the second exit port 76 become clogged. The location of the second overflow slots 94a, 94b below the foam overflow slots 92a, 92b causes any foam in the trough 69 to flow towards the second overflow slots 94a, 94b (from right to left in FIG. 1). Thus, the first liquid component or tramp oil will flow back into the tank via outlet tube 44 rather than overflow from the coalescer and cause a mess. The exit volume 96 is defined by the side plate 16b of the coalescer housing 11 and the second wall 62 of the removable cartridge 32. Located in the exit volume 96 is a dam or weir 98 (see FIG. 2) over which liquid mixture flows before it exits via the first exit port 42.

Thus, the present invention provides a coalescer with a removable cartridge having a grid of parallel plates which may be easily fixed in a preferred location and easily removed for cleaning. The cleaner the parallel plates of the grid, the more efficient the coalescer will function. A clean coalescer will separate a first liquid component from a liquid mixture more efficiently than a coalescer with dirt accumulated between the plates. If the cartridge is removed, all the plates may be removed together, leaving a non-obstructed tank that can be easily cleaned so that dirt will not accumulate on the bottom of the coalescer. These and other objects and advantages will be apparent from those skilled in the art. It is to be understood that the invention of this application is not limited by the description hereinabove. Various other alternative embodiments will be apparent to those of ordinary skill in the art without departing from the scope of the present invention. Thus, applicant intends to be bound only by the following claims.

I claim:

1. A coalescer for separating a first liquid component from a multiple-component liquid mixture wherein the first liquid component has a lower specific gravity than the liquid mixture, the coalescer comprising:

a housing comprising a front plate, a back plate, a pair of opposed side plates and a bottom plate which define an interior of said housing, said housing having an entry port and a first exit port and a flow path therebetween, one of said plates having a discharge port therethrough;

a cartridge removably received inside the interior of the housing, said cartridge comprising an inclined top wall, a first wall, a second wall, a front wall, a back wall and a grid located underneath said inclined top wall and between said first and second walls, said grid comprising a plurality of parallel inclined plates residing along the flow path between the entry port and the first exit port, thereby to promote separation of the first liquid component from the liquid mixture when the liquid mixture flows along the flow path to the first exit port, the grid causing the first liquid component to rise upwardly in the housing, through an outlet formed in the top wall of the cartridge; and into a trough defined by upper portions of the first, second, front and back walls of the cartridge above said inclined top wall of said cartridge, said front and back walls of said cartridge contacting said front and back plates of said housing, said cartridge having a second exit port aligned with said discharge port, whereby the first liquid component moves upwardly through the outlet, into the trough, down the inclined top wall of the cartridge and then through a discharge spout engaged with the aligned second exit port and discharge port as the liquid mixture flows along the flow path.

2. The coalescer of claim 1 wherein the first wall of the cartridge is spaced from one of the side plates of the housing, defining a fill volume therebetween, the first wall of the cartridge having at least one elongated vertically oriented opening to allow the liquid mixture to flow from the fill volume toward the grid.

3. The coalescer of claim 2 wherein the first wall of the cartridge has three vertically oriented openings.

4. The coalescer of claim 2 wherein the first wall of the cartridge includes an upper horizontally oriented escape slot above a bottom edge of the outlet, thereby to vent foam into the fill volume.

5. The coalescer of claim 1 wherein the discharge spout is threadably engaged with the aligned discharge port and second exit port.

6. The coalescer of claim 4 wherein the first wall of the cartridge further includes at least one foam overflow slot at an upper end thereof, to allow foam to flow from the fill volume into the trough and exit the coalescer via the discharge spout during a foam overflow condition.

7. The coalescer of claim 1 wherein said discharge spout extends through the discharge port and the second exit port to position the cartridge inside the interior of the housing.

8. The coalescer of claim 1 and further comprising:

tracks formed in the front and back plates of the housing, said first and second walls of said cartridge having outer edges slidably received in said tracks to properly align the cartridge inside the interior of the housing.

9. The coalescer of claim 1 and further comprising:

at least one handle on the cartridge to facilitate removal of the cartridge from the interior of the housing.

10. The coalescer of claim 1 wherein the cartridge includes a pair of spaced handles, each handle comprising an indentation in one of said first and second walls of the cartridge.

11. The coalescer of claim 1 wherein the second wall of the cartridge is spaced from one of the side plates of the housing, defining an exit volume therebetween, the second wall of the cartridge having at least one overflow slot formed in an upper end thereof, whereby upon inadvertent obstruction of the second exit port the first liquid component overflows from the trough into the exit volume.

12. A coalescer for separating a first liquid component from a multiple-component liquid mixture as the mixture flows along a flow path wherein the first liquid component has a lower specific gravity than the liquid mixture, the coalescer comprising:

a housing comprising a front plate, a back plate, a pair of opposed side plates and a bottom plate, said plates defining an interior of said housing, said housing having an entry port and an exit port and a flow path therebetween, one of said plates having a threaded discharge port therethrough;

a cartridge removably received inside the interior of the housing, said cartridge comprising an inclined top wall, opposed first and second walls, opposed front and back walls, and a grid located underneath said inclined top wall between said first and second walls and between said front and back walls, said grid comprising a plurality of parallel inclined plates to promote separation of the first liquid component from the liquid mixture, the grid causing the first liquid component to rise upwardly, through an outlet formed in the inclined top wall of the cartridge and into a trough defined by upper portions of the first, second, front and back walls of the cartridge and said inclined top wall of said cartridge, a threaded exit port formed through one of said walls of said cartridge, said threaded exit port being aligned with said discharge port when said cartridge is inside said interior of said housing, a discharge spout having a threaded end and a hollow interior, said threaded end of said discharge spout being threadably engaged with said threaded discharge port and said threaded exit port of said cartridge whereby the first liquid component moves upwardly through the outlet into the trough and out of the trough through the hollow interior of said discharge spout as the liquid mixture flows along the flow path.

13. The coalescer of claim 12 further comprising a plurality of vertically oriented tracks formed in a pair of said plates of said housing, said first and second walls of said cartridge having outer edges slidably engaged with said vertically oriented tracks.

14. The coalescer of claim 12 wherein said cartridge has at least one handle.

15. A coalescer for separating a first liquid component from a multiple-component liquid mixture wherein the first liquid component has a lower specific gravity than the liquid mixture, the coalescer comprising:

a housing comprising a front plate, a back plate, a pair of opposed side plates and a bottom plate which define an interior of said housing, said housing having an intermediate bottom wall located inside said interior of said housing, said intermediate bottom wall having a sludge hole which communicates with a sludge line outside the housing, a pump located inside said housing below said intermediate bottom wall for pumping said liquid mixture between a first entry port and a first exit port along a flow path, a cartridge removably received inside the interior of the housing and supported on said intermediate bottom wall, said cartridge extending between said front and back plates of said housing, said cartridge comprising a top wall, a first wall, a second wall, a front wall, a back wall and a grid located underneath said top wall and between said first and second walls, said grid comprising a plurality of parallel inclined plates residing along the flow path between the first entry port and the first exit port, thereby to promote separation of the first liquid component from the liquid mixture when the liquid mixture flows along the flow path to the first exit port, the grid causing the first liquid component to rise upwardly, through an outlet formed in the top wall of the cartridge into a trough in fluid communication with a discharge spout, whereby the first liquid component moves upwardly through the outlet into the trough and then through discharge spout as the liquid mixture flows along the flow path during operation of the pump.

16. The coalescer of claim 15 wherein the first wall of the cartridge is spaced from the entry port, defining a fill volume therebetween, the first wall of the cartridge having at least one elongated vertically oriented opening to allow the liquid mixture to flow from the fill volume toward the grid.

17. The coalescer of claim 15 wherein said front wall of said cartridge has a second exit port therethrough, said second exit port being aligned with a discharge port formed through said front plate of said housing.

18. The coalescer of claim 16 wherein the first wall of the cartridge includes an upper horizontally oriented escape slot, the escape slot located above a bottom edge of the outlet, thereby to vent foam into the fill volume.

19. The coalescer of claim 17 wherein said discharge spout is threadably engaged with said aligned second exit port and said discharge port of said housing.

20. The coalescer of claim 15 wherein the first entry port and first exit port pass through the same side plate of said housing.

21. A coalescer for separating a first liquid component from a multiple-component liquid mixture as the mixture flows along a flow path wherein the first liquid component has a lower specific gravity than the liquid mixture, the coalescer comprising:

a housing comprising a bottom plate, a front plate, a back plate, and a pair of opposed side plates defining an interior of said housing, said housing having an entry port and an exit port, one of said plates of said housing having a threaded discharge port therethrough;

a cartridge removably received inside the interior of the housing, said cartridge having an inclined top wall, a front wall contacting said front plate of said housing, a back wall contacting said back plate of said housing, and a grid located underneath said inclined top wall between said front and back walls, said grid comprising a plurality of parallel inclined plates to promote separation of the first liquid component from the liquid mixture as the liquid mixture flows along the flow path, the grid causing the first liquid component to rise upwardly in the cartridge, a threaded exit port formed through one of said walls of said cartridge, said threaded exit port being aligned with said threaded discharge port, a discharge spout having a threaded end and a hollow interior, said threaded end of said discharge spout being threadably engaged with said threaded discharge port and said threaded exit port of said cartridge, whereby the first liquid component moves upwardly inside the housing and through the hollow interior of said discharge spout into a container.

22. The coalescer of claim 21 further comprising a pump located inside said housing for moving said liquid mixture along said flow path.

23. The coalescer of claim 21 wherein said cartridge further has first and second walls on opposite sides of said grid, said front, back, first and second walls having upper portions above said inclined top wall, said upper portions of said walls and said inclined top wall defining a trough.

24. The coalescer of claim 23 further comprising vertical tracks formed in the front and back plates of the housing, said first and second walls of said cartridge having outer edges slidably received in said tracks to prevent said cartridge from moving horizontally inside the interior of the housing.

25. The coalescer of claim 21 wherein said front and back walls of said cartridge have open portions to facilitate cleaning the grid.

26. The coalescer of claim 21 further comprising an intermediate bottom wall located inside said interior of said housing, said intermediate bottom wall having a sludge hole which communicates with a sludge line passing through said front plate of said housing.

27. A coalescer for separating a first liquid component from a multiple-component liquid mixture wherein the first liquid component has a lower specific gravity than the liquid mixture, the coalescer comprising:

a housing comprising a front plate, a back plate, a pair of opposed side plates and a bottom plate which define an interior of said housing, said housing having an entry port and a first exit port and a flow path therebetween, a pair of said plates having tracks formed therein, a cartridge removably received inside the interior of the housing, said cartridge comprising an inclined top wall, a first wall, a second wall, and a grid located underneath said inclined top wall and between said first and second walls, said grid comprising a plurality of parallel inclined plates thereby to promote separation of the first liquid component from the liquid mixture when the liquid mixture flows along the flow path, said first and second walls of said cartridge having outer edges slidably received in said tracks to properly aligned the cartridge inside the interior of the housing.

28. The coalescer of claim 27 the grid causing the first liquid component to rise upwardly in the housing, through an outlet formed in the top wall of the cartridge; and into a trough defined by upper portions of the first, second, front and back walls of the cartridge above said inclined top wall of said cartridge, whereby the first liquid component moves upwardly through the outlet, into the trough, down the inclined top wall of the cartridge and then through a discharge spout as the liquid mixture flows along the flow path.

* * * * *